United States Patent [19]

Frommhold

[11] Patent Number: 4,495,936
[45] Date of Patent: Jan. 29, 1985

[54] FLEXIBLE SOLAR HEAT COLLECTOR

[76] Inventor: Joachim Frommhold, Popitzweg 13/22/224, 1000 Berlin 13, Fed. Rep. of Germany

[21] Appl. No.: 468,308

[22] Filed: Feb. 22, 1983

[30] Foreign Application Priority Data

Feb. 26, 1982 [DE] Fed. Rep. of Germany ....... 3206866

[51] Int. Cl.³ .................................................. F24J 3/02
[52] U.S. Cl. .................................... 126/426; 126/417; 126/444; 165/46
[58] Field of Search ............... 126/415, 418, 426, 444, 126/417, 450; 4/498, 499, 503; 165/46, 83, 96

[56] References Cited

U.S. PATENT DOCUMENTS

| | | | |
|---|---|---|---|
| 2,996,729 | 8/1961 | Bailey | 126/415 |
| 3,512,186 | 5/1970 | Sanford | 4/503 |
| 4,004,380 | 1/1977 | Kwake | 126/415 X |
| 4,360,005 | 11/1982 | Sharpe | 126/426 X |
| 4,414,958 | 11/1983 | Hozumi et al. | 126/450 |

FOREIGN PATENT DOCUMENTS

| | | | |
|---|---|---|---|
| 2476814 | 8/1981 | France | 126/418 |
| 901758 | 2/1982 | U.S.S.R. | 126/426 |

Primary Examiner—Margaret A. Focarino
Attorney, Agent, or Firm—Michael J. Striker

[57] ABSTRACT

A solar heat collector of a flexible material is composed of superposed flexible foils joined together along their rims to form a heat collecting chamber therebetween. A flow of heat carrying medium is directed through the collecting chamber. In order to keep the foils in a taut condition, two opposite rim portions of the foils are formed with marginal chambers for accommodating a weight. The bottom foil is supported on an insulating plate with raised opposite lateral walls and the tensioning weights hang over the edges of the lateral walls to tension the foils by the force of gravity. If desired, the clearance between respective foils can be adjusted by the provision of discrete supporting bars of different height.

4 Claims, 7 Drawing Figures

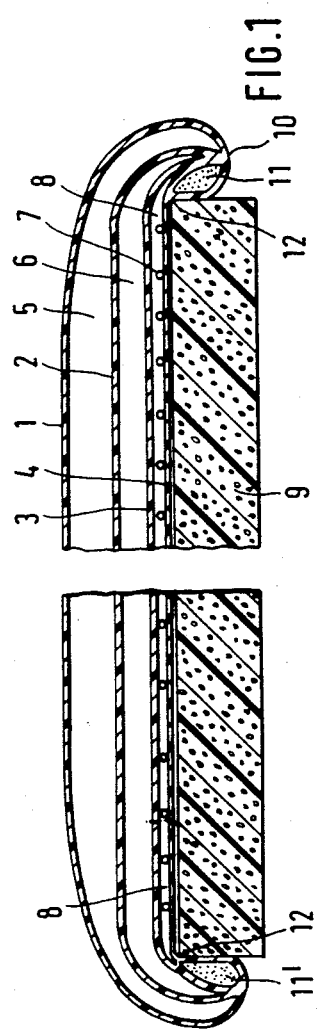
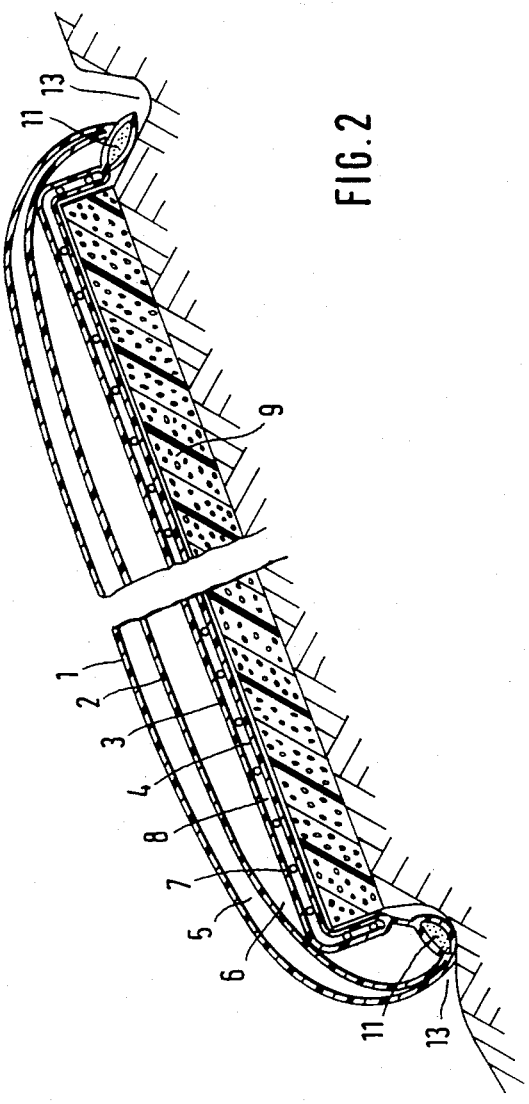

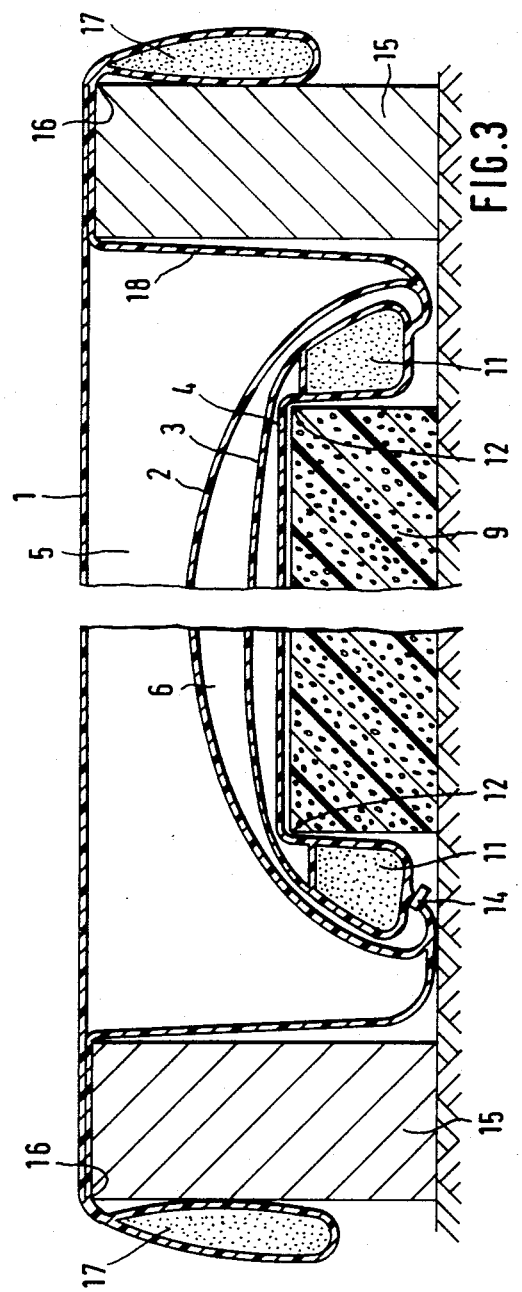

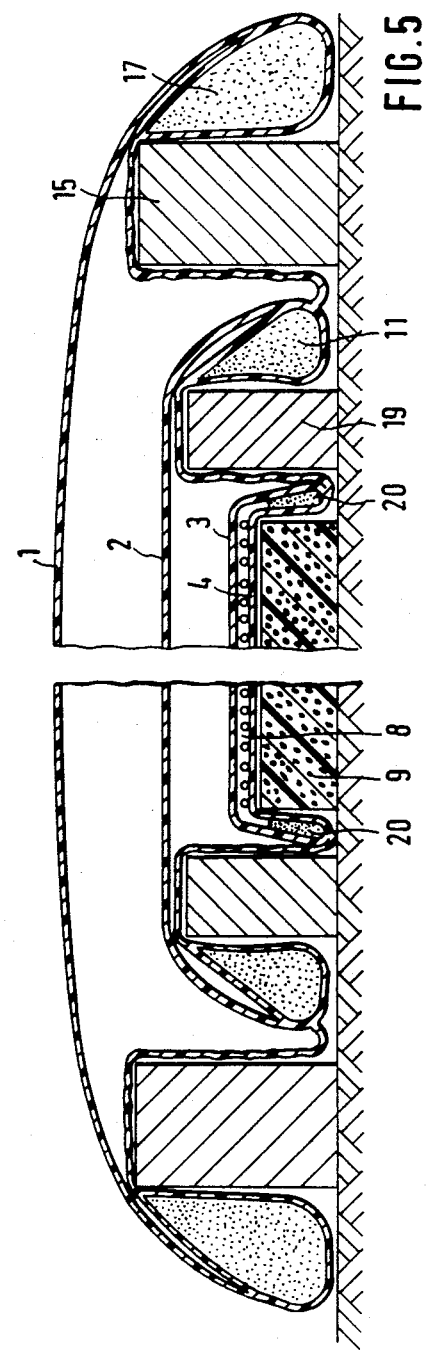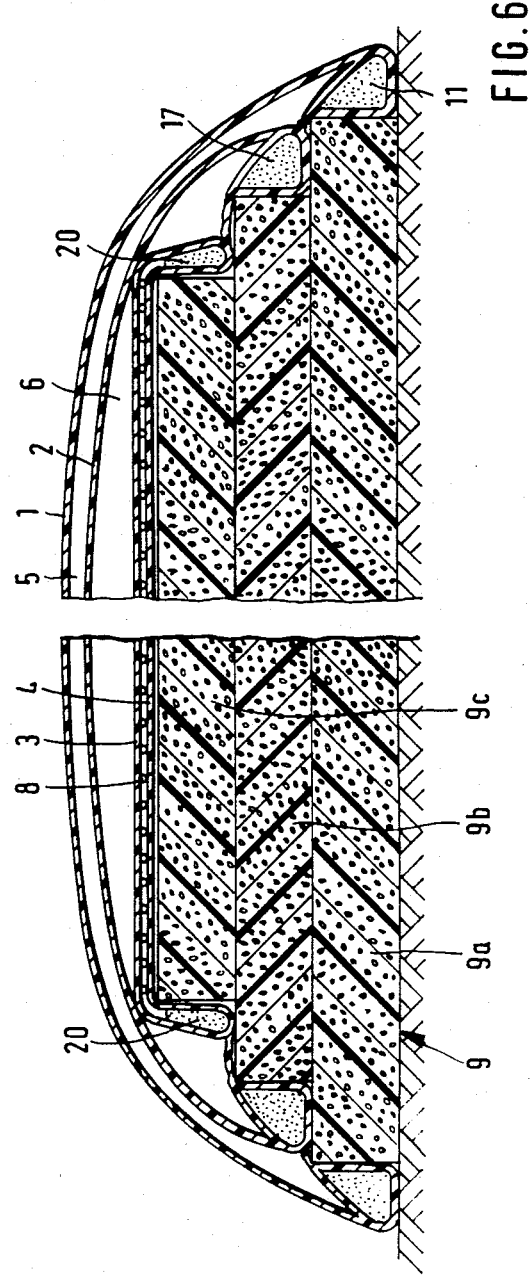

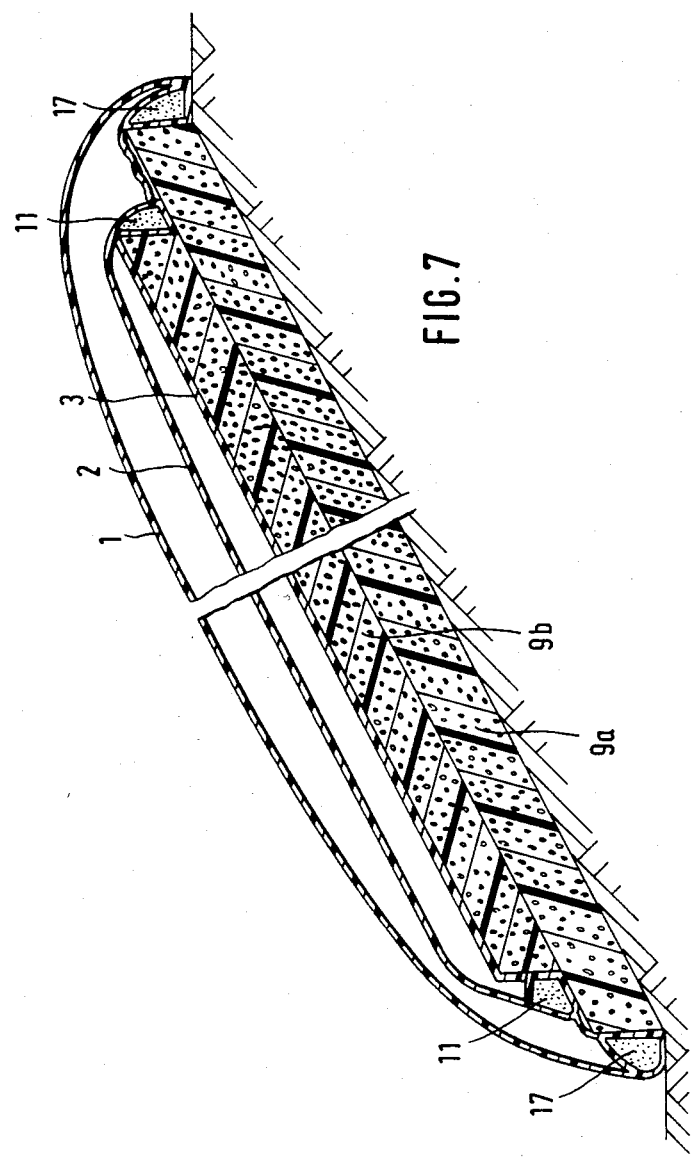

FLEXIBLE SOLAR HEAT COLLECTOR

BACKGROUND OF THE INVENTION

The present invention relates in general to solar heat collectors and in particular to a solar heat collector of a flexible material constituted by two or more superposed flexible foils joined together along their rims to form a heat collecting chamber therebetween and including means for passing a flow of a heat carrying medium at least to a portion of the heat collecting chamber.

Solar heat collectors of this kind serve for heating a liquid medium such as water flowing through the heating collecting chamber, by incoming solar rays. In known heat collectors of this kind, described for example in DE-OS No. 24 36 986, two light-permeable plastic foils are provided above the heat collecting chamber. At the bottom side, the chamber is closed by a heat-absorbing dark foil lying on a heat insulating support. To improve the heat insulating quality, an air cushion is maintained between the two transparent foils arranged above the upper surface of the solar heat collecting means. Such solar heat collectors made of a flexible material have the advantage that they can be transported in rolled-up condition and unrolled in a simple manner into operative condition. This foldability represents a substantial advantage in comparison with solar heat collectors made of rigid material.

On the other hand, known solar heat collectors of flexible material have a disadvantage in that it is difficult to maintain the individual foils in the desired spaced condition from each other. In the aforementioned prior-art heat collector, the collecting chamber, designed for receiving water, must be fully filled up with water in order to impart to the heat collecting structure the needed tension preventing the folding of the foil. Only when the collecting chamber is sufficiently filled up with water can the heat insulating air cushion be created between the two transparent upper foils. The prerequisite condition is always the maintenance of sufficient water pressure in the collecting chamber, inasmuch as, as soon as the chamber is even partially empty and exposed to a lower water pressure, it has the tendency to collapse. If on the other hand water pressure in the collecting chamber is excessively high, the chamber expands and bulges into the insulating space and the desired effect is lost. In view of the fact that the heat carrying water simultaneously acts as a tensioning medium for the solar heat collector, it is necessary to avoid any pressure increase and consequently no steam can be generated in the collecting chamber, for example.

SUMMARY OF THE INVENTION

It is therefore a general object of the present invention to overcome the aforementioned disadvantages.

More particularly, it is an object of the invention to provide an improved solar heat collector of flexible material of the above described type in which, independently from the amount of heat carrying medium flowing through the collection chamber and independently from its pressure, always preserves tension in the foils sufficient for preventing the heat collecting chamber from collapsing.

In keeping with these objects and others which will become apparent hereafter, one feature of the invention resides in the provision of tensioning weights attached to two opposite rim portions of at least one of the foils bounding the collection chamber, whereby the two opposite rim portions hang over the edges of lateral sides of the supporting member and tensioning the foils by the force of gravity.

The lateral walls of the supporting member extend parallel to the opposite rim portions of the foils and the tensioning weights suspend from the edges of the lateral walls thus deviating the foils and imparting thereto tensile stress in their longitudinal direction. As a consequence, it is of no importance whether the heat collecting chamber is filled up with heat carrying water to its full capacity or only partially. For this reason, there are no limitations regarding the structural design of the passages for the water throughflow. For example, the water flow through the chamber can be either free or by means of a pipe system or controlled by means of a felt suction layer. Instead of a liquid, it is also possible to employ a gaseous medium such as air or steam for the heat transfer. By virtue of the continuous maintenance of the tensioning stress in the foils it is made possible to create without problems an air cushion between additional transparent foils on the upper side of the solar heat collector and to maintain the transparent foils in proper distance from one another.

The supporting member can be either in the form of a simple supporting plate defining peripheral edges extending parallel to the rim of the solar heat collector or can be in the form of a plurality of marginal bars spaced apart from each other and stepped in height from the inner bars outwardly. The outer marginal bars of increased height form supporting edges for the transparent foils and for their tensioning weights which maintain proper distance between the two transparent edges independently from the pressure therebetween.

Preferably, the tensioning weights are arranged in marginal chambers extending along the opposite rim portions. In this manner, the tensioning weights constitute an integral part of the foil arrangement and a particularly uniform and materialprotecting introduction of the tensioning forces is obtained.

The tensioning weights can be constituted either by solid weight bodies or by filling the aforementioned marginal chambers with loose solid particles or with a liquid, preferably with water.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a sectional side view of an embodiment of a solar heat collector of this invention consisting of a plurality of superposed chambers provided with tensioning weights common to all foils;

FIG. 2 shows the solar heat collector of FIG. 1 on an oblique support;

FIG. 3 shows an embodiment of a heat collector of this invention provided with discrete tensioning weights and with a supporting member composed of a central support plate and of marginal supporting bars;

FIG. 4 is a modification of the solar heat collector of this invention in which the inner and outer top foils are tensioned over marginal bars;

FIG. 5 shows an embodiment similar to that of FIG. 4 in which the lower inner and outer foils are tensioned over the edges of underlying supporting means;

FIG. 6 is an embodiment of a solar heat collector of this invention designed for being supported on a stepped support; and FIG. 7 is an embodiment similar to FIG. 6 in which the solar heat collector is supported on an oblique stepped support.

DESCRIPTION OF THE PREFERRED EMBODIMENTS

The flexible solar heat collector illustrated in FIG. 1 consists of two superposed transparent foils 1 and 2 of a flexible material enclosing an air-filled chamber 5 serving as a top heat insulating member. Another top heat insulating chamber 6 is formed between the foil 2 and a foil 3 of a heat collecting chamber 8 bounded by the foil 3 and a bottom foil 4. The heat collecting chamber 8 encloses conduits 7 for supplying a heat carrying medium such as water.

The bottom foil 4 of the collecting chamber 8 rests on an insulating plate 9 made of a plastic foam, for example.

In this embodiment, all foils 1–4 are hermetically joined together along a peripheral seam 10, for example by welding or by gluing. If desired, the superposed chambers can be produced simultaneously by the method of blowing foil bubbles. A marginal chamber 11 is formed adjacent the seam 10. The marginal chamber 11 is filled with a liquid or with a loose material such as sand, and overhangs the opposite edges 12 of the supporting plate 9. The filling material in the opposite marginal chambers 11 form at corresponding ends of the solar heat collector pliant tensioning weights suspended over the edges of the supporting plate and ensuring that, even if internal pressure of fluid media in collecting chamber 8 increases, the foils do not become unduly deformed and will not bulge into the space of adjoining chambers. At the same time, the tensioning weights in the marginal chambers 11 hold the flexible solar heat collector in its position on the supporting means even if exposed to wind and need not be fastened by additional fastening means. The opposite upper edges 12 of the supporting plate 9 extend parallel to each other to permit uniform suspension of the tensioning weights 11 and 11' along the upright walls of the supporting plate, thus converting gravitational force into tensile stress in foils 1–4.

In the embodiment according to FIG. 2, the supporting plate 9 is arranged at an oblique angle, and the opposite lateral walls of the support 9 adjoin parallel grooves 13 in the underlying substrate. In contrast to the preceding embodiment, the marginal chambers 11, filled with the tensioning material, do not hang freely over the edges 12 but rest on the substrate in grooves 13. Water or other heat carrying agent is conducted in the collecting chamber 8 between foils 3 and 4, preferably by means of conduits but also by means of a porous material such as felt or the like.

In the embodiment of the solar heat collector according to FIG. 3, the marginal chambers 11 for tensioning weights are formed separately from outer marginal chambers 17 between foils 1 and 18. The foil 2 is attached along its rim to the bottom side of the marginal chamber 11 and upon filling the latter with the loading material the foil 2 is also subject to tensioning forces so that the volume of chamber 6 is held constant even at an increase of its inner pressure. The pressure fluid in chamber 6 is introduced via a filling valve 14 arranged below the chamber 11.

In this embodiment the supporting means includes a central supporting plate 9 with the upper edges 12 and arranged at a distance from the lateral wall of the plate 9, and parallel to the latter extend marginal supporting bars 15 formed with upper peripheral edges 16. The uppermost foil 1 and the rim chambers 17 with the additional tensioning weights are bent over the edges 16 to tension foil 1 under force of gravity. The tensioning weights in chambers 17 are again in the form of loose solid material, such as sand, or a liquid material such as water. The edges 16 of bars 15 are at a higher level than the edges 12 of supporting plate 9, and consequently the resulting insulating chamber 5 between the foils 1 and 2 maintains its shape even if pressure in the chamber 5 is subject to variations.

In order to make the solar heat collector of this embodiment as an integrated gas-tight and liquid-tight unit, the rim of foil 1 is joined together with an intermediate foil 18 which at its other end is connected to foil 2 near its junction point with chambers 11. The intermediate foil 18 is loosely suspended along the inner wall of the supporting bars 15.

In the embodiment according to FIG. 4, the uppermost foil 1 is held by means of the aforementioned outer weights in marginal chambers 17 bent over the upper edges 16 and suspended along the outer walls of supporting bars 15, similarly as in the embodiment of FIG. 3. The difference in this arrangement is the provision of supporting marginal bars 19 on opposite sides of the supporting plate 9, so that no inner pressure need be established in the insulating chamber 6 in order to keep the foil 2 in a stretched condition. In this embodiment, the heat collecting chamber 8 between the innermost foils 3 and 4 is supported exclusively on the plate 9 and maintains its shape by the internal pressure of water flowing therethrough.

The construction of the solar heat collector according to FIG. 5 is similar to the embodiment of FIG. 4, except for the arrangement of inner supporting bars 19, which are spaced apart from the central supporting plate 9. Each of the superposed foils 1, 2 and 3 is formed along its rim with a marginal chamber 17, 11 and 20 filled with ballast material and having over the opposite outer edges of the supporting means so as to keep the corresponding foils in a taut condition. The height of respective supporting elements increases from the center outwardly to maintain the desired clearance between the foils 1, 2 and 3. In contrast to the embodiment of FIG. 4, the marginal chambers 17 and 11 are formed in the intermediate foils and are joined at their bottom end to the foils 1 and 2. As a consequence, the outermost foil 1 resumes a slightly convex shape due to a pressure increase between the foils 1 and 2. This arched shape is desirable in the case when rain water is to be prevented from accumulating on the surface of the uppermost foil.

Another difference from the embodiment of FIG. 4 is the connection of the marginal chamber 20 to the upper foil 3 of the heat collecting chamber 8, through which a heat carrying medium flows. Either of the two foils 3 and 4 is commissioned by the force of gravity acting on weights in marginal chambers 20. Similarly as in the preceding examples, even in this embodiment all foils 1–4 are interconnected by loosely suspended intermediate foil portions in order to obtain a gas-tight and liquid-tight heat collecting unit.

In the embodiment according to FIG. 6, the supporting means are formed by superimposed plates 9a, 9b and 9c forming together a staircase-like support 9. This configuration makes it possible to use separate tensioning weights in marginal chambers 11, 17 and 20, whereby the outer foils 1 and 2 are tensioned without the aid of discrete supporting bars. The solar heat collecting chamber 8 in this embodiment encloses between foils 3 and 4 a mat through which a flow of a heat carrying medium is maintained. Tensioning weights in marginal chamber 20 hang over the top plate 9c and keep the mat in taut condition. Pressure of heat insulating gas in chambers 5 and 6 between the foils 1, 2 and 3 produces an arcuate shape of the top foils 1 and 2.

A similar construction of the solar heat collector is depicted in FIG. 7. The supporting plates 9a and 9b are designed for use on an inclined surface and have a trapezoidal cross section with opposite side walls directed perpendicularly to the horizontal. The marginal chambers 17 and 11 are attached to the rim portions of foils 1 and 2, respectively, and the chambers 11 are also connected to the bottom foil 3 holding the latter in a stretched condition on the top surface of supporting plate 9b.

As mentioned before, in the preferred embodiment of this invention, the two top foils 1 and 2 are employed for passing light beams on a heat-absorbing surface and at the same time prevent heat losses to the environment. The lower foils 3 and 4 act as a heat absorber for heating a heat carrying medium flowing therebetween or for heating an additional heat absorber, for example a pipe system in the heat collecting chamber through which the heat carrying medium flows.

In using flexible materials which can be folded and rolled, very large collecting surfaces are feasible, which are inexpensive and easy to install.

During the installation process, the supporting plate 9 is first laid in position or deposited as a foamed layer on a substrate. Thereafter, the foils of the heat collecting chambers are unfolded on the thus created insulated supporting plate and the opposite marginal chambers are filled with water for example to provide the requisite tensioning weights. Thereafter the heat insulating foils are unfolded over the heat collecting chamber and tensioned by means of the opposite tensioning weights. If desired, an air cushion is applied between the top heat insulating foils. In this manner large-size heat collecting surfaces of a length which is many times larger than the width can be installed in a very simple manner. As has been shown, this invention enables a simple installation of heat collectors on inclined surfaces the angle of which is adjusted for an optimum collection of the impinging solar rays.

The marginal chambers for accommodating the tensioning weights can be designed in various configurations. For example, in the embodiment according to FIG. 1, the right-hand marginal chamber 11 is fully closed and separated from the heat collecting chamber 8. In contrast, the left-hand marginal chamber 11' communicates with the heat collecting chamber 8. When for example a free flow of water passes through the chamber 8, it fills up over the edge 12 the fold constituting the marginal chamber 11' and acts the tensioning weight.

It will be understood that each of the elements described above, or two or more together, may also find a useful application in other types of constructions differing from the types described above.

While the invention has been illustrated and described as embodied in specific examples of the flexible solar heat collectors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A flexible solar heat collector for use in connection with supporting means defining two opposite upright sides, comprising at least two superposed flexible foils joined together along their rims to form a heat collecting chamber therebetween, means for feeding heat carrying medium through said collecting chamber, and pliant tensioning weights provided at two opposite rim portions of at least one of said foils to hang over the edges of said upright sides of the supporting means and to stress the foils by the force of gravity, the two opposite rim portions of said foils being formed with marginal chambers adjoining the foils, and said pliant tensioning weights being provided in said marginal chambers to prevent bulging of the upper foil when internal pressure in the collecting chamber increases.

2. A flexible solar heat collector as defined in claim 1 wherein said tensioning weights are loose solid particles.

3. A flexible solar heat collector as defined in claim 1 wherein said tensioning weight is a liquid, preferably water.

4. A flexible solar heat collector as defined in claim 1, wherein said supporting means include a plate of insulating material defining two opposite upper edges extending parallel to said opposite rim portions of said foil.

* * * * *